United States Patent Office 3,396,568
Patented Aug. 13, 1968

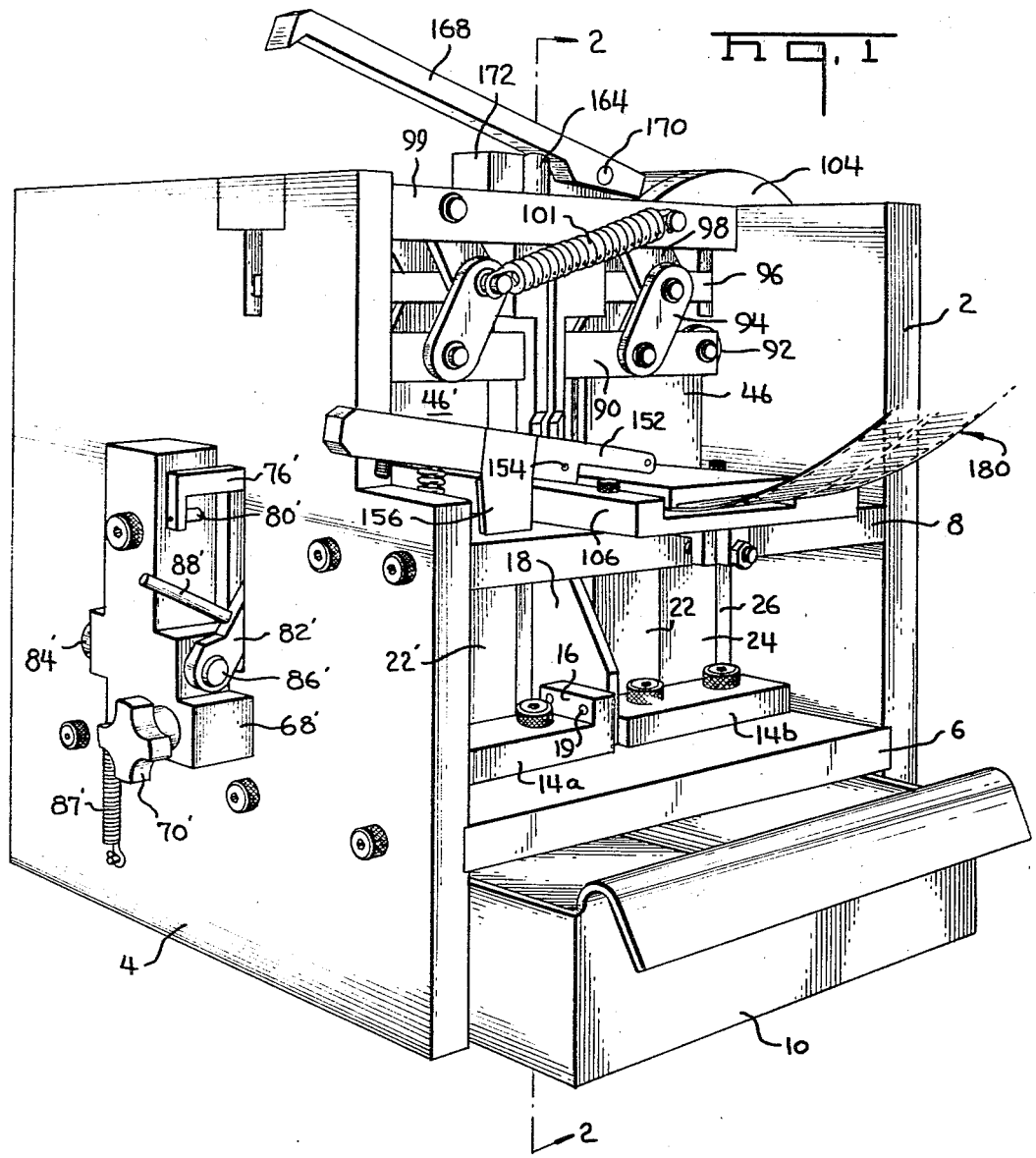

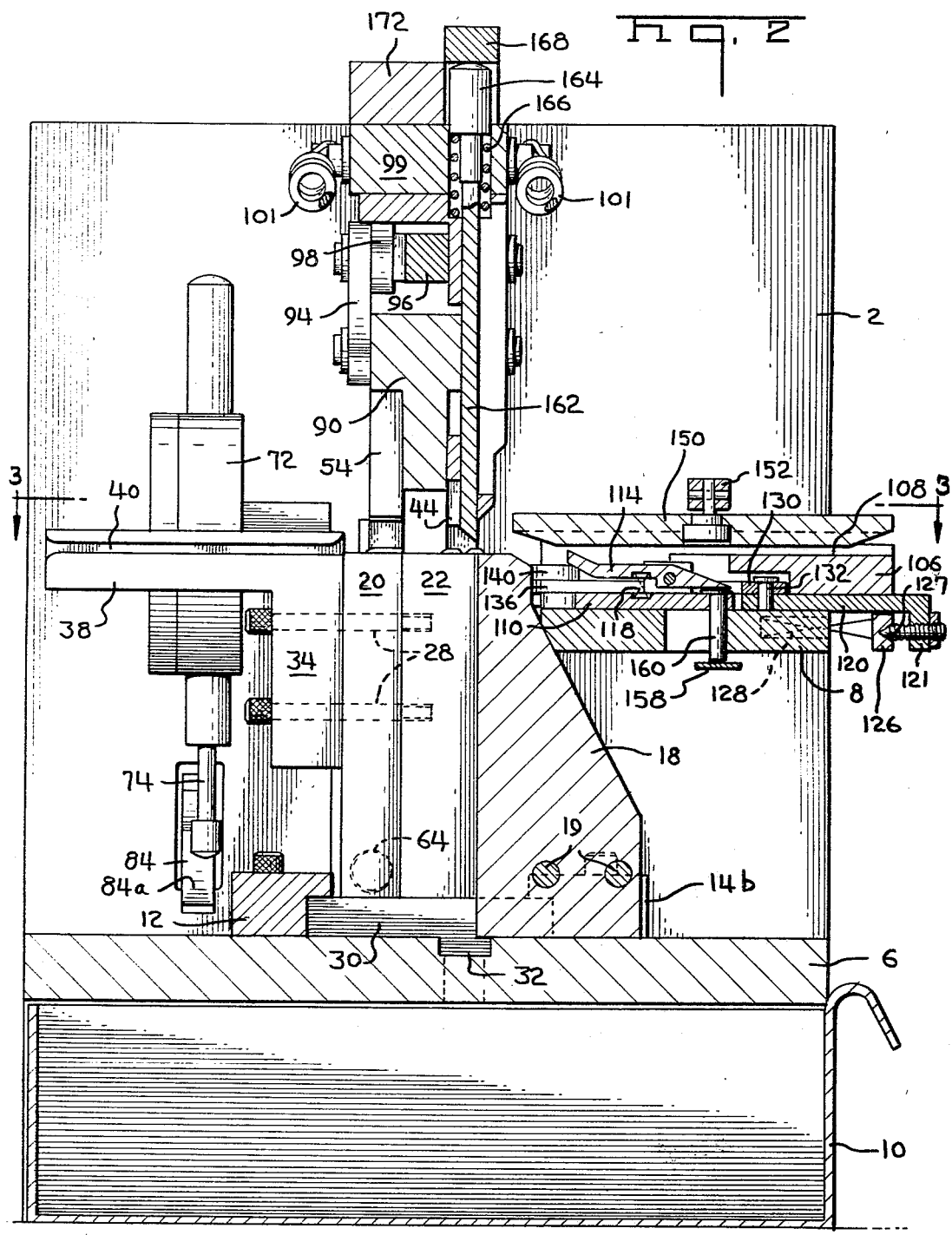

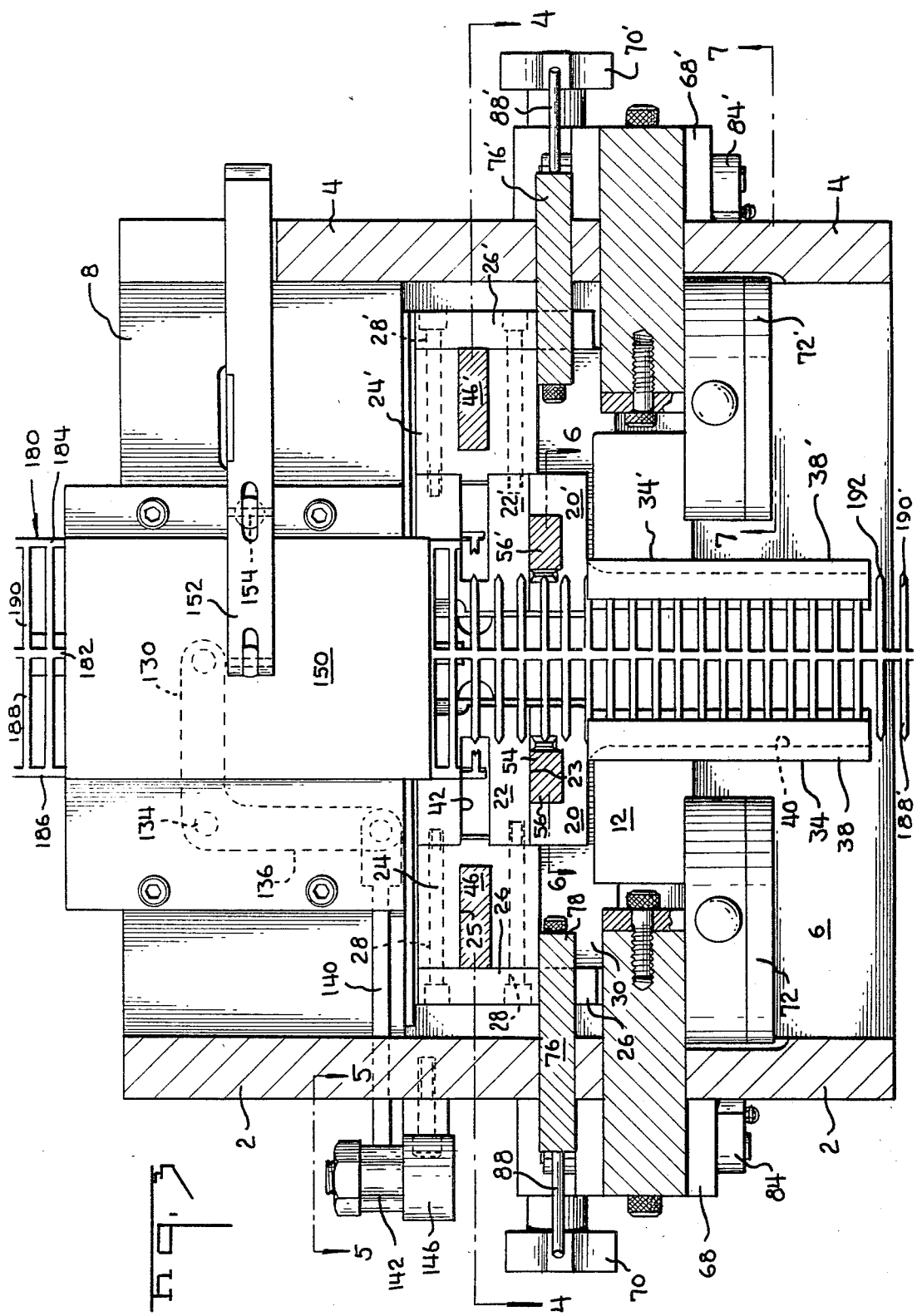

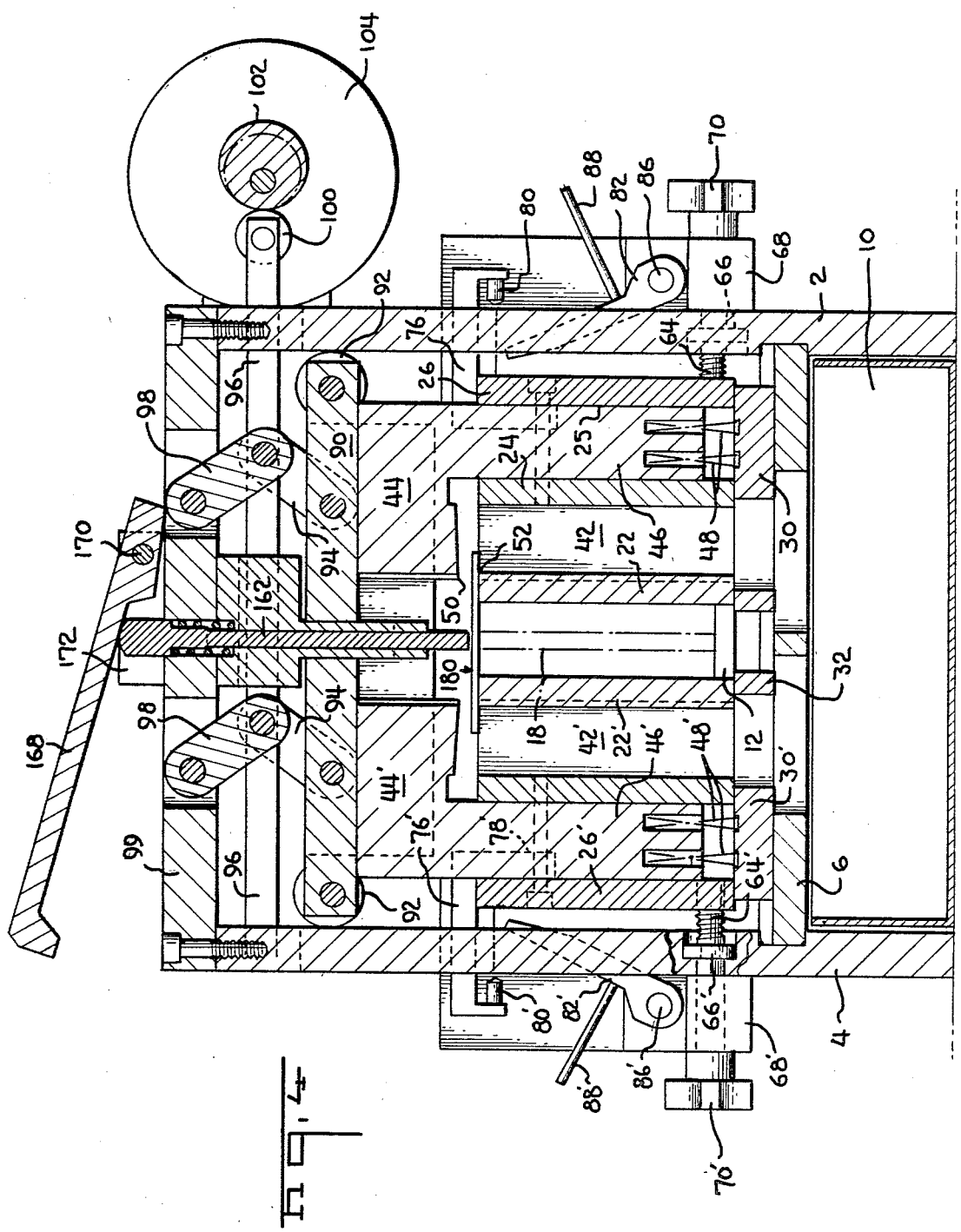

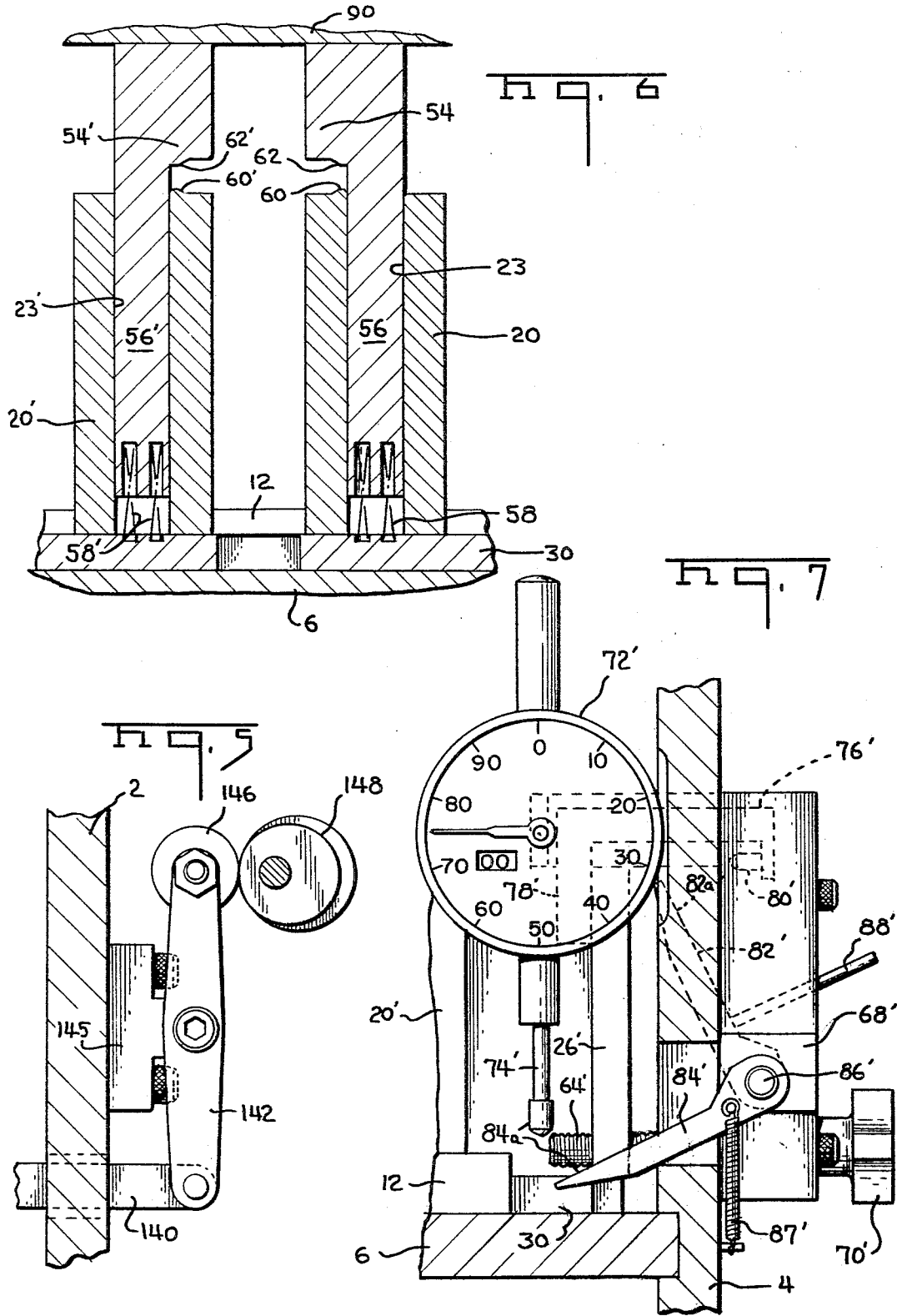

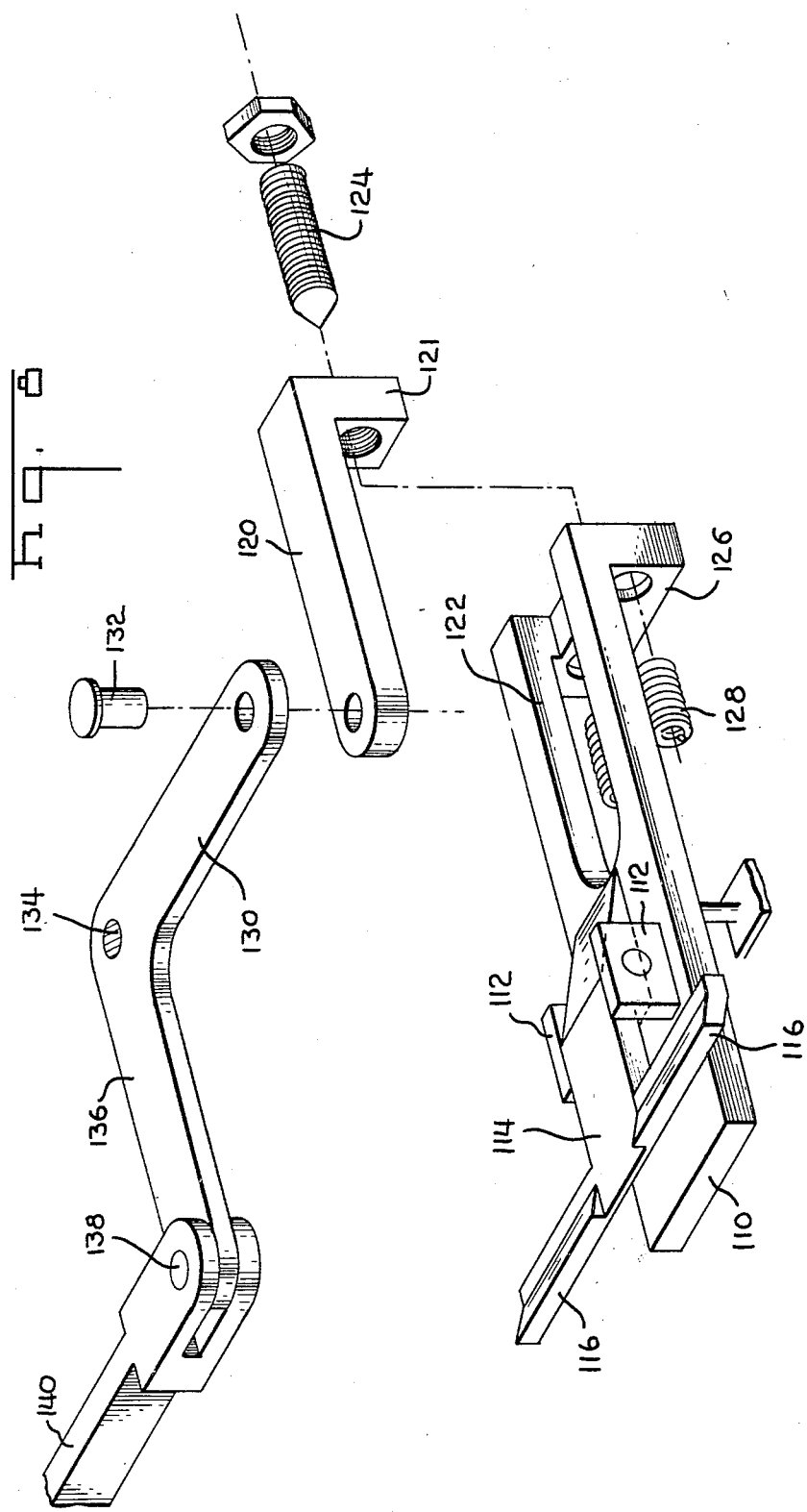

3,396,568
STOCK TRIMMING APPARATUS
Paul Turner Hahn, Harrisburg, Pa., assignor to AMP Incorporated, Harrisburg, Pa.
Filed Feb. 14, 1966, Ser. No. 527,297
4 Claims. (Cl. 72—335)

ABSTRACT OF THE DISCLOSURE

Apparatus for trimming and swaging the longitudinal edges of strip stock comprises means for feeding the stock along a predetermined path through a working zone. Two sets of trimming tools and two sets of swaging tools are provided in the working zone, one set of each being provided on each side of the strip stock. Trimming and swaging devices are adjustably mounted for movement relatively towards and away from the strip thereby to permit trimming of the strip to any desired width and swaging of the edges regardless of the amount of material trimmed from the edges of the strip. Severing device is provided at the entrance to the working zone of the apparatus and upstream, relative to the direction of strip feed, from the trimming tooling so that short lengths of trimmed stock having any desired dimension can be produced.

BACKGROUND OF THE INVENTION

This invention relates to metal working machines of the type adapted to perform one or more operations, such as trimming, punching, swaging, etc. on the side edges of a continuous strip of stock metal. The disclosed embodiment of the invention is particularly adapted to trim and swage the ends of terminal posts in ladder strip form although alternative uses for the invention will be apparent to those skilled in the art.

It is an object of the invention to provide an improved metal working apparatus. It is a further object to provide an apparatus for trimming and swaging the opposite sides of a continuous length or strip of stock metal. It is a further object to provide an apparatus for trimming and swaging the ends of terminal posts in ladder strip form. A still further object is to provide an apparatus for trimming the ends of terminal posts which can be rapidly adjusted to trim the posts to varying lengths.

These and other objects of the invention are achieved in a preferred embodiment of an apparatus comprising a means for feeding terminal posts in ladder strip form to a trimming and swaging zone. Trimming and swaging tooling assemblies are provided on each side of the trimming and swaging zone, one assembly being adapted to work on each side of the strip material. The tooling assemblies are independently adjustable towards and away from each other so that the terminal posts can be trimmed to any desired length. The trimming and swaging tooling in each tooling assembly is, furthermore, constructed as a unit so that both the trimming and swaging tooling can be adjusted in one operation.

In the drawing:

FIGURE 1 is a perspective view of a preferred form of apparatus in accordance with the invention;

FIGURE 2 is a longitudinal sectional view, taken along the lines 2—2 of FIGURE 1 and looking towards the motor side of the apparatus;

FIGURE 3 is a sectional plan view, taken along the lines 3—3 of FIGURE 2, showing the arrangement of the trimming and swaging tool assemblies on each side of the feed stock material;

FIGURES 4, 5, 6, and 7 are views taken along the lines 4—4, 5—5, 6—6, and 7—7 of FIGURE 3; and FIGURE 8 is a fragmentary perspective view of portions of the strip feed mechanism.

The herein disclosed embodiment of the invention is intended to trim and swage the sides of a strip 180 of terminal posts shown best in FIGURE 3. Each post comprises two arms 188, 190 which extend from a medial carrier strip 182. The ends of the arms are integral with side carrier strips 184, 186. Terminal posts of this type are intended to be used in printed circuit boards or similar devices and the ends of the arms 188, 190 are trimmed from the side carrier strips 184, 186 before they are applied to the board. The ends are further advantageously swaged to form a pyramid-like tip portion indicated at 192.

Depending upon the exact circumstances in which the terminal posts are used, the arms 188, 190 will be of varying lengths and it is uneconomic to manufacture posts in the numerous lengths required. It is, therefore, desirable to produce a standard strip as shown at 180 and to trim the individual arm portions 188, 190 of each terminal post to the desired length. The embodiment of the invention described below incorporates adjustable trimming and swaging tooling for trimming the post arms 188, 190 to any desired length.

Referring first to FIGURES 1–4, the disclosed embodiment comprises a frame made up of parallel side plates 2, 4 and transverse plates 6, 8 extending between the side plates. The transverse plate 6 extends for substantially the full length of the side plates while the plate 8 extends only partially inwardly from the right-hand side of the apparatus as viewed in FIGURE 2. A scrap basket 10 is provided beneath the transverse plate 6 for catching the scrap metal produced during operation as will be described below. Transverse gibs 12, 14a, 14b are mounted on the upper surface of the plate 6 and extend normally of the planes of the side plates. The gib 12 is continuous while the gibs 14a, 14b are separated from each other and are spaced from the gib 12 to accommodate the trimming and swaging tooling. A flange 16 extends upwardly from the gib 14a and a shear plate 18 is secured to this flange by fasteners 19.

A pair of tooling assemblies are slidably and adjustably mounted on each side of the trimming and swaging zone which appears in the central portion of FIGURE 3. Since these tooling assemblies are substantially identical to each other, a description of one will suffice for both. Accordingly, only the tooling assembly on the motor side of the apparatus will be described in detail and similar reference numerals, differentiated by prime marks, will be used for corresponding parts of the two tooling assemblies. The motor side of the apparatus appears on the right in FIGURES 1, 4, and 6 and on the left in FIGURE 3.

The tooling assembly on the motor side comprises a plurality of blocks 20, 22, and 24, and a plate 26 which are secured to each other by suitable fasteners as indicated at 28. The block 20 is U-shaped in cross-section and disposed against the side of the block 22 whereby a vertically extending guideway 23 is formed for the shank portion of a movable swaging tool 54, see FIGURES 3 and 6. The blocks 22 and 24 are also substantially U-shaped and have their open sides facing leftwardly in FIGURE 3. The opening in the block 22 thus defines a passageway 42 through which a trim scrap metal can fall into the scrap basket 10. The opening in the block 24 defines a guideway 25 for the shank portion 46 of the trimming tool 44 as will be described below. The block 24 is secured against a vertical plate 26 and the blocks 20, 22, 24, and the plate 26 are all secured to a slidable support plate 30 mounted on the upper surface of the frame plate 6 between the gibs 12, 14a, 14b. As shown in FIGURE 2, this support plate 30 has a centrally located key 32 extending into the keyway in the plate 6 to further assist in guiding the tooling assembly accurately towards and away from the strip stock material.

A block 34 is secured to the left-hand side of the tooling assembly as viewed in FIGURE 2 (the downstream side of the apparatus with reference to the direction of strip feed) and has a horizontally extending arm 38 in which there is provided a groove 40 for guiding the strip material after the post arms 188, 190 have been trimmed and swaged. Since each tooling assembly is provided with one of these guide blocks, the channel in the arm 38' co-operates with the channel in the arm 38 to support both sides of the strip.

The tooling for shearing the ends of the strip comprises a movable shear block 44 (see FIGURE 4) disposed above the previously identified opening 42 and having a downwardly extending shank 46 which is slidably received in the open central portion 25 of the block 24. Compression springs 48 interposed between the lower end of the shank portion 46 of the shear block and the upper surface of the guide plate 30 normally bias this shear block upwardly to the position shown in FIGURE 4. The shearing operation is accomplished by the edges 50, 52 of the shear block 44 and the block 22 when these two blocks move relative past each other and the scrap material falls through the opening 42 and through aligned openings in the slidable plate 30 and in the fixed support plate 6 into the scrap basket 10.

The swaging tooling (FIGURES 3 and 6) comprises a movable swaging tool 54 having a shank portion 56 extending into the opening 23 of the block 20. This swaging tool is biased upwardly by means of springs 58 interposed between the lower end of the shank portion 56 and the upper surface of the slide plate 30. The swaging operation is performed by swaging die portions 60, 62 provided on the opposed surfaces of the swaging tool and the block 20.

Adjustment of the tooling assembly as a unit towards and away from the center line of the strip stock material is accomplished by means of an adjusting screw 64 (FIGURE 4) which is rotatably mounted in the side plate 2 and in a block 68 mounted on the external surface of the side plate 2. This rotatable mounting of the screw is achieved by means of a collar 66 fitted in a suitable recess on the internal surface of the side plate 2 and a knob 70 on the projecting end of the screw, the intermediate portion of this screw being unthreaded and having a bearing in the block 68 and in the side plate 2. The threaded end of the screw extends into a threaded opening in the plate 26 so that turning of the knob 70 has the effect of moving the entire tooling assembly including the blocks and plates 20, 22, 24, 30, and the plate 26 towards or away from the strip material. As previously noted, the two tooling assemblies, shown on the right and left-hand side of the trimming and swaging zone in FIGURE 3, can be independently adjusted so that any desired length in the post portions 188, 190 can be achieved.

It is desirable that the lengths of the trimmed post arms 188', 190' be accurately and precisely controlled and that the exact length be immediately determinable when adjustment is made. Accordingly, the disclosed embodiment is provided with indicating means which will now be described for indicating the exact post length when the tooling assemblies are in any given position of adjustment.

The trimmed lengths of the post arms 188', 190' are shown on indicator dials 72, 72' mounted downstream from the trimming and swaging zone and adjacent to the side plates 2, 4. FIGURE 7 shows details of the post-measuring system for the tooling on the side opposite to the motor side of the apparatus and will be described below. The indicator dial 72' has a depending plunger 74' which, when pushed upwardly, gives a reading on the dial face of the amount of travel of the plunger. The relative position of the tooling is determined by means of an L-shaped bracket 76' secured to the plate 26' by means of a depending arm 78'. The horizontal arm 76' of this bracket has a depending flange in which there is mounted a generally conical contact member 80' which faces inwardly towards a suitable opening in the side plate 4. An arm 82' which extends upwardly from a shaft 86' is adapted to move against this contact member, the shaft 86' being journalled in the block 68'. An arm 84' is keyed or otherwise secured to the shaft 86' and extends inwardly through a suitable opening in the side plate 4 to a location beneath the plunger 74'. A lever 88' extends from the arm 82' and beyond the surface of the block 68'. The arm 84' is biased downwardly by means of a suitable spring 87' secured at one end to the arm 84' and at its other end to a suitable ear to the side plate 4.

When it is desired to determine the trimmed length of the post arm 190', the lever 88' is pressed downwardly until the arm 82' moves against the contact member 80'. During such downward movement of the lever 88', the shaft 86' will be rotated and the arm 84' will move against the lower end of the plunger 74' and will move this plunger upwardly. The exact post length can be read directly on the dial of the dial indicator. This post length measuring arrangement must, of course, be calibrated to read directly the trimmed length of the post.

Certain dimensional relationships must be maintained for the post measuring mechanism to function properly. The surfaces 82a', 84a' of the arms 82', 84' which move against the contact member and the end of the plunger define planes which extend normally of each other and which, if projected, would extend through the axis of rotation of the shaft 86'. Also, the axis of the plunger and the axis of the contact member 80' extend normally of each other and are equidistant from the axis of rotation of the shaft 86'.

Referring now to FIGURES 1, 2 and 4, the movable shearing tools 44, 44' and the movable swaging tools 54, 54' are moved downwardly during each operating cycle by means of a press bar 90 extending transversely between the internal surfaces of the side plates 2, 4. This press bar has rollers 92 at each end thereof which bear against the surface of the side plates and has links 94 pivoted thereto on each side and above each of the tooling assemblies. The links 94 are pivoted at their other ends to an oscillatable drive bar 96 and additional links 98 pivoted to the drive bar are, in turn, pivoted to a cross piece 99 secured at its ends to the side plates. The drive bar 96 is reciprocated by means of a cam 102 on the end of the shaft of a motor 104 and which engages a cam follower 100 on the end of the drive bar 96. The parts are biased to the positions shown in FIGURE 4 by the springs 101 which normally hold the toggles comprising the links 94, 98 broken as shown in FIGURE 1.

The feeding means for feeding the strip 180 to the shearing and swaging zone is shown best in FIGURES 1, 2, and 8 and comprises a fixed feed block 106 on the upper surface of the plate 8 having a feed guide channel 108 on its upper surface. A reciprocable feed slide 110 is slidably mounted in a suitable groove beneath the block 106 and has ears 112 on its upper side between which the feed pawl 114 is pivoted. This feed pawl has laterally extending arms 116 and is biased upwardly by means of the spring 118 acting between the upper surface of the slide and the underside of the pawl. The arms 116 thus lodge behind arms 188, 190 of the strip so that upon leftward movement of this feed slide, as viewed in FIGURE 2, the strip is advanced towards the shearing and swaging zone. The trailing sides of the arms 116 slope downwardly so that the pawl will ride beneath the strip during its rearward stroke.

This feed slide is reciprocated by means of a pusher bar 120 which is fitted in a suitable recess 122 on the slide. This feed slide has a depending flange 121 at its rearward end through which an adjusting screw 124 is threaded. The conical point of this adjusting screw is received in a recess 127 in a depending flange 126 of the feed slide. Springs 128 are interposed between the edge of the plate 8 and the leftwardly facing side (as viewed in FIGURE 2) of the flange 126.

The forward end of the pusher bar 120 is connected by means of a pivot pin 132 to one arm 130 of a bell crank pivoted at 134 to the plate 8. The other arm 136 of the bell crank is pivotally connected at 138 to a clevis on the end of an arm 140. The arm 140, in turn, is reciprocated by means of a lever 142 (see FIGURE 5) which is pivoted intermediate its ends 144 to a block 145 on the side plate. A cam follower 146 on the upper end of the lever 142 is engaged by a cam 148 on the shaft of the previously identified motor 104. It will be apparent that during each cycle of rotation of the shaft, the lever 140 is reciprocated thereby oscillating the bell crank 130, 136 and advancing and retracting the pusher bar 120 which, acting through screw 124, advances the feed slide. The cam follower 146 is held against the cam 148 by the action of the springs 128 which act through the pusher bar, the bell crank, and the arm 140.

A pressure pad 150 is mounted above the strip material in the channel 108 to hold the strip against, and in engagement with, the feed pawl 114. This pressure pad is pivoted to a lever 152 which, in turn, is pivoted intermediate its ends at 154 to the upper surface of the plate 106. The end of this lever extends laterally beyond the side plate 4 and the lever is biased upwardly by a spring as shown. The pressure pad can thus be lifted from engagement with the strip by merely depressing this lever. A relatively thin plate 156 is secured to the lever 152 on the left-hand side of the pivotal axis thereof (as viewed in FIGURE 1) and extends downwardly through the frame plate 8. The plate 156 has an arm 158 secured to its lower end which extends inwardly beneath the feed slide and beneath a pin 160. This pin is slidably mounted in an opening in the feed slide and has a head portion disposed beneath the trailing end of the feed pawl. When the lever 152 is depressed and the pressure pad 150 is raised, the arm 158 is also raised thereby to swing the feed pawl 114 about its pivotal axis and disengage the arms 116 from the strip material.

At the end of every run, it is necessary to sever the previously severed and swaged strip material from the incoming strip and this is advantageously done immediately adjacent to the last post which has been severed in order to minimize waste. Accordingly, there is provided a slidable severing bar 162 which cooperates with the shear plate 18. The upper end of the shear member 162 is enlarged and is slidably mounted in a recess in the cross piece 99. This shear member is normally maintained in its raised position by a spring 166 in the recess. The shear member can be depressed to sever the strip by means of a lever 168 pivotally mounted at 170 on a block 172 on the upper side of the cross piece 99.

A salient advantage of the disclosed embodiment of the invention is that the stock material 180 can be of standard dimensions and can be trimmed to any desired size on both sides of the center carrier strip 182. Moreover, the swaging tooling is secured to the trimming tooling so that one adjustment changes the position of both sets of tooling. Adjustment can be made rapidly and without changing any of the tooling involved. Finally, the dial indicator system gives the exact dimension of the lengths of the posts after swaging.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:
1. Apparatus for trimming the longitudinal edges of a metal strip and swaging the trimmed edges comprising, means for feeding said strip to a trimming and swaging zone, a pair of tooling assemblies, one of said tooling assemblies being disposed on each side of said swaging zone, each of said tooling assemblies comprising an anvil means for supporting edge portions of said strip and die means, said die means being cooperable with said anvil means to effect trimming and swaging of said strip, and means for adjusting said tooling assemblies independently of each other towards and away from the medial axis of a strip being fed through said zone thereby to vary the width of said strip after trimming.

2. Apparatus for trimming the side edge portions of strip stock and swaging the trimmed edges, said apparatus comprising:
means for intermittently feeding said stock through a working zone,
manually operable severing means at the entrance to said working zone for severing said stock,
trimming means in said working zone on each side of said path downstream, relative to the direction of feeding of said strip, from said severing means,
swaging means on each side of said path downstream from said trimming means,
said trimming means and said swaging means being movable for adjustment purposes relatively towards and away from the centerline of said stock thereby to permit trimming of said stock to varying widths.

3. Apparatus as set forth in claim 2 comprising a press bar extending transversely with respect to said strip across said working zone and above said trimming and swaging means, and means for reciprocating said press bar in synchronism with feeding of said stock material thereby to actuate said trimming and swaging means during intervals between feeding of said stock.

4. Apparatus as set forth in claim 2 including indicating means associated with each of said trimming and swaging means for indicating the location of each trimming and swaging means with respect to the axis of said strip material thereby to indicate the width of said strip after trimming.

References Cited
UNITED STATES PATENTS

| | | | |
|---|---|---|---|
| 674,852 | 5/1901 | Coe | 72—421 |
| 2,004,555 | 6/1935 | Kleinmann et al. | 72—335 |
| 2,508,534 | 5/1950 | Paxson | 72—405 |
| 2,591,483 | 4/1952 | West | 72—338 |
| 2,968,913 | 1/1961 | Onulak | 59—6 |
| 3,202,122 | 8/1965 | Bedford | 113—119 |

CHARLES W. LANHAM, *Primary Examiner.*

E. M. COMBS, *Assistant Examiner.*